United States Patent
Plank et al.

(10) Patent No.: US 9,220,281 B2
(45) Date of Patent: Dec. 29, 2015

(54) HYDRATED FAT PIECE COMPOSITIONS AND DOUGH ARTICLES MADE THEREFROM

(75) Inventors: David W. Plank, Taylors Falls, MN (US); Braden J. Erickson, Eden Prairie, MN (US); Alan A. Oppenheimer, Savage, MN (US); Jon D. (Duke) Seibold, Mahtomedi, MN (US); Michael A. Staeger, Minnetonka, MN (US)

(73) Assignee: General Mills, Inc., Minneapolis, MN (US)

( * ) Notice: Subject to any disclaimer, the term of this patent is extended or adjusted under 35 U.S.C. 154(b) by 430 days.

(21) Appl. No.: 12/481,146

(22) Filed: Jun. 9, 2009

(65) Prior Publication Data

US 2009/0311387 A1 Dec. 17, 2009

Related U.S. Application Data

(60) Provisional application No. 61/060,637, filed on Jun. 11, 2008.

(51) Int. Cl.
| | | |
|---|---|---|
| A23D 7/00 | (2006.01) |
| A23D 9/00 | (2006.01) |
| A21D 10/04 | (2006.01) |
| A23D 9/013 | (2006.01) |
| A23L 1/09 | (2006.01) |
| A21D 2/16 | (2006.01) |
| A23D 7/005 | (2006.01) |
| A23D 7/01 | (2006.01) |
| A23D 7/05 | (2006.01) |

(52) U.S. Cl.
CPC ............ *A21D 2/16* (2013.01); *A23D 7/0053* (2013.01); *A23D 7/011* (2013.01); *A23D 7/05* (2013.01)

(58) Field of Classification Search
CPC ....... A21D 2/16; A23D 7/0053; A23D 7/011; A23D 7/05
USPC .................................... 426/390, 602
See application file for complete search history.

(56) References Cited

U.S. PATENT DOCUMENTS

| | | | |
|---|---|---|---|
| 2,526,302 A | | 10/1950 | Turgasen |
| 3,859,445 A | * | 1/1975 | Langhans ............ 426/24 |
| 3,950,561 A | | 4/1976 | Collins |
| 4,390,561 A | | 6/1983 | Blair et al. |
| 4,447,462 A | | 5/1984 | Tafuri et al. |
| 4,590,086 A | * | 5/1986 | Takahashi et al. ........... 426/602 |
| 4,883,684 A | | 11/1989 | Yang |
| 5,064,677 A | | 11/1991 | Cain et al. |
| 5,147,670 A | | 9/1992 | Cebula et al. |

(Continued)

FOREIGN PATENT DOCUMENTS

WO 2015/097417 7/2015

OTHER PUBLICATIONS

Oil List and Lye Table (Sep. 14, 2004) available at http://home.earthlink.net/~skinesscentuals/LyeTable.htm.*

*Primary Examiner* — Rena L Dye
*Assistant Examiner* — Assaf Zilbering
(74) *Attorney, Agent, or Firm* — John L. Crimmins; Rachel A. Kahler

(57) ABSTRACT

Disclosed are hydrated fat piece compositions along with various methods of making hydrated fat piece compositions. Also disclosed are dough compositions and baked articles made using the hydrated fat piece compositions of the invention.

45 Claims, 5 Drawing Sheets

(56) References Cited

U.S. PATENT DOCUMENTS

| | | | |
|---|---|---|---|
| 5,306,516 A | 4/1994 | Letton et al. | |
| 5,431,948 A | 7/1995 | Cain et al. | |
| 5,472,728 A | 12/1995 | Miller et al. | |
| 5,612,080 A | 3/1997 | Gruetzmacher et al. | |
| 5,667,837 A | 9/1997 | Broomhead et al. | |
| 5,683,738 A | 11/1997 | Gruetzmacher et al. | |
| 5,756,142 A | 5/1998 | Reckweg et al. | |
| 5,908,655 A * | 6/1999 | Doucet | 426/606 |
| 5,989,618 A | 11/1999 | Thurman et al. | |
| 6,013,255 A * | 1/2000 | Edens et al. | 424/94.1 |
| 6,022,578 A | 2/2000 | Miller | |
| 6,106,885 A | 8/2000 | Huizinga et al. | |
| 6,156,370 A | 12/2000 | Huizinga et al. | |
| 6,162,483 A | 12/2000 | Wester | |
| 6,228,417 B1 | 5/2001 | Hidaka et al. | |
| 6,231,914 B1 | 5/2001 | Huizinga et al. | |
| 6,322,842 B1 | 11/2001 | Reddy et al. | |
| 6,423,363 B1 | 7/2002 | Traska et al. | |
| 6,517,884 B1 | 2/2003 | Bauer-Plank et al. | |
| 6,649,202 B1 | 11/2003 | Huxel | |
| 6,777,018 B2 | 8/2004 | Floeter et al. | |
| 6,929,816 B2 | 8/2005 | Wester | |
| 7,105,195 B2 | 9/2006 | Plank et al. | |
| 7,108,888 B2 | 9/2006 | Floeter | |
| 7,118,773 B2 | 10/2006 | Floeter et al. | |
| 7,223,435 B2 | 5/2007 | Besselink et al. | |
| 7,247,335 B2 | 7/2007 | Floter | |
| 7,498,453 B2 | 3/2009 | Van Toor et al. | |
| 7,524,524 B2 | 4/2009 | Floeter | |
| 7,547,459 B2 | 6/2009 | Plank et al. | |
| 2002/0071896 A1 | 6/2002 | Palmer et al. | |
| 2002/0114874 A1 | 8/2002 | Floeter et al. | |
| 2002/0142072 A1 | 10/2002 | Huxel | |
| 2003/0113427 A1 | 6/2003 | Floeter et al. | |
| 2003/0161934 A1 | 8/2003 | Floter | |
| 2003/0161935 A1 | 8/2003 | Kakuda et al. | |
| 2003/0175402 A1 | 9/2003 | Wester | |
| 2004/0071856 A1 | 4/2004 | Floeter | |
| 2004/0071857 A1 | 4/2004 | Besselink et al. | |
| 2004/0219277 A1 | 11/2004 | Wester | |
| 2005/0136167 A1 * | 6/2005 | Kraklow et al. | 426/549 |
| 2005/0220965 A1 | 10/2005 | Floeter | |
| 2006/0019021 A1 | 1/2006 | Plank et al. | |
| 2006/0058401 A1 | 3/2006 | Ishikawa et al. | |
| 2006/0280855 A1 | 12/2006 | Van Den Berg et al. | |
| 2007/0071875 A1 | 3/2007 | Wester | |
| 2007/0185340 A1 | 8/2007 | Van Toor et al. | |
| 2007/0243308 A1 | 10/2007 | Yu et al. | |
| 2008/0118624 A1 | 5/2008 | Boer et al. | |
| 2008/0175958 A1 * | 7/2008 | Staeger et al. | 426/89 |
| 2008/0268130 A1 | 10/2008 | Bons et al. | |
| 2009/0029025 A1 | 1/2009 | Pernetti | |
| 2009/0047409 A1 | 2/2009 | Schreiber et al. | |
| 2009/0142467 A1 | 6/2009 | Aldred et al. | |

* cited by examiner

HYDRATED FAT PIECE COMPOSITIONS AND DOUGH ARTICLES MADE THEREFROM

CROSS-REFERENCE TO RELATED APPLICATIONS

This application claims the benefit of U.S. Provisional Application Ser. No. 61/060,637, entitled HYDRATED FAT PIECE COMPOSITIONS AND DOUGH ARTICLES MADE THEREFROM, filed Jun. 11, 2008, the disclosure of which is incorporated herein by reference.

BACKGROUND

Dough composition that are suitable for use in bakery products such as biscuits, etc. commonly include fat, water, flour, eggs, and a leavening agent (e.g., yeast) as the main ingredients. The fats that are typically used in these products are triglyceride-based fats that commonly contain a fairly high level of saturated fats and trans fatty acids. With the present trend towards healthier bakery products, there is a great demand for products that contain healthier fats (i.e., having a reduced amount of saturated fats and trans fatty acids) without sacrificing taste and baking performance of the dough. In view of the foregoing, alternative fat compositions that are low in saturated and/or trans fatty acids are very desirable.

SUMMARY

The present invention provides hydrated fat piece compositions that comprise a plurality of hydrated fat pieces wherein the pieces individually comprise: (a) a solid fat phase; and (b) a plurality of water droplets distributed throughout the solid fat phase. The hydrated fat piece compositions of the invention comprise a plurality of discrete fat pieces that are individually separate and distinct from one another. The pieces may have any desired shape, for example, chips, flakes, rods, spheres, and other geometries. At room temperature, the individual fat pieces making up the hydrated fat piece composition do not adhere to one another to an appreciable degree.

In many embodiments, the solid fat phase comprises a base oil and a hardstock fat. In many embodiments, the base oil is selected from the group consisting of natural or genetically modified soybean oil, corn oil, canola oil, copra oil, cottonseed oil, peanut oil, safflower oil, olive oil, sunflower oil, peanut oil, palm oil, palm kernel oil, coconut oil, rice bran oil, rapeseed oil, and other vegetable nut/seed oils, partially hydrogenated vegetable oils and mixtures thereof. Also useful are butter, lard, tallow, fish oils, fatty acids and triglycerides derived from microorganisms, animals, and plants. The base oil is typically present in an amount ranging from about 40% wt. to about 80% wt., or from about 50% wt. to about 70% wt. In some embodiments, the base oil comprises less than about 5% wt. trans fatty acids. In some embodiments, the base oil is not hydrogenated.

In many embodiments, the hardstock fat is selected from the group consisting of natural or genetically modified soybean oil, corn oil, canola oil, copra oil, cottonseed oil, peanut oil, safflower oil, olive oil, sunflower oil, peanut oil, palm oil, palm kernel oil, coconut oil, rice bran oil, rapeseed oil and other vegetable nut/seed oils, butter, partially hydrogenated vegetable oils and mixtures thereof, lard, tallow, fish oils, fatty acids and triglycerides derived from microorganisms, animals, and plants. The hardstock fat is typically present in an amount up to about 30% wt. In some embodiments, the hardstock fat is non-hydrogenated, partially-hydrogenated, or fully-hydrogenated. In some embodiments, the hardstock fat has an iodine value of less than about 10.

Hydrated fat piece compositions of the invention may be low in trans fatty acids (i.e., "low trans") or may be free of trans fatty acids (i.e., "trans free"). Compositions of the invention that are low in trans fatty acids typically comprise about 50% wt. or less trans fatty acids. Compositions of the invention that are free of trans fatty acids can contain about 4% wt. or less trans fatty acids.

In some embodiments, the hydrated fat pieces comprise a hydrocolloid. Examples of hydrocolloids include agar, alginate, alginate+calcium, arabinoxylan, carrageenan, carrageenan+calcium, carboxymethylcellulose, cellulose, cellulose gum, cyclodextrins (in the presence of fat or other hydrophobic ligand), curdlan, gelatin, gellan, β-Glucan, guar gum, gum arabic, hydroxypropylmethylcellulose (HPMC), locust bean gum, methyl cellulose, pectin, pectin+calcium, soybean soluble polysaccharide (SSP), starch, xantham gum, and mixtures thereof.

In some embodiments, the hydrated fat pieces comprise an emulsifier. Examples of emulsifiers include lecithins, mono and diglycerides, acid esters of mono and diglycerides (AMGS or alpha-monoglycerol stearate is a distilled monoglyceride of this class), di-acetyltartaric esters of monoglycerides (DATEM), polyglycerol esters, sucrose esters, sorbitan esters, polysorbates, propylene glycol fatty acid esters, stearoyl-2-lactylates, oleoyl lactylates, ammonium phosphatides, silicates, and mixtures thereof.

The hydrated fat pieces of the invention comprise water that is typically present in an amount that ranges from about 5% wt. to about 50% wt. The water in the hydrated fat pieces is present in the form of a plurality of water droplets that are dispersed throughout the fat pieces. In many embodiments, the water droplets have a size ranging from about 1.5 μm to about 10 μm.

In some embodiments, the hydrated fat pieces comprise a water activity modifier. Examples of water modifiers include NaCl, $MgCl_2$, glycerol, pyrophosphate, sodium phosphate, or mixtures thereof.

In another aspect, the invention provides dough compositions comprising (i) a dough; and (ii) a plurality of hydrated fat pieces distributed throughout the dough; wherein the hydrated fat pieces comprise (a) a solid fat phase; and (b) a plurality of water droplets distributed throughout the solid fat phase. The dough compositions may be laminated dough compositions or non-laminated dough compositions.

In yet another aspect, the invention provides a method of making a hydrated fat piece composition comprising the steps of: (a) heating a solid fat to form a liquid fat; (b) adding water to the liquid fat and agitating the resulting composition to form a liquid water-in-oil emulsion; (c) applying the liquid water-in-oil emulsion to a surface of a rotating chilled drum; (d) cooling the liquid water-in-oil emulsion while in contact with the surface of the rotating chilled drum to form a solid sheet comprising the water-in-oil emulsion; and (e) scraping the solid sheet of the water-in-oil emulsion from the surface of the rotating chilled drum; wherein the scraping causes the solid sheet to fracture to form a hydrated fat piece composition comprising a plurality of discrete particles wherein the hydrated fat piece particles individually comprise a solid fat phase; and a plurality of water droplets distributed throughout the solid fat phase.

BRIEF DESCRIPTION OF THE DRAWINGS

The present invention will be further explained with reference to the attached Figures, wherein like structure is referred to by like numerals views, and wherein.

DETAILED DESCRIPTION

The embodiments of the invention described herein are not intended to be exhaustive or to limit the invention to the precise forms disclosed in the following detailed description. Rather, the embodiments are chosen and described so that others skilled in the art can appreciate and understand the principles and practices of the invention.

The invention relates generally to hydrated fat piece compositions, methods of making hydrated fat piece compositions, and to dough compositions and baked articles made using the hydrated fat piece compositions of the invention.

Figure 1:
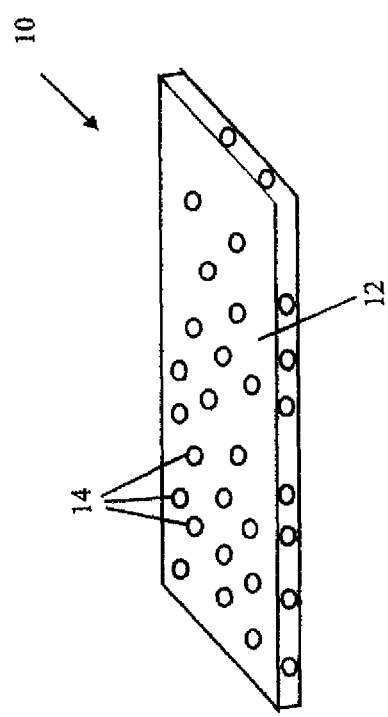
FIG. 1 is a perspective view of a representative embodiment of a hydrated fat piece of the invention.

Referring now to FIG. 1, a representative embodiment of a hydrated fat piece 10 of the invention is shown. Hydrated fat piece 10 comprises continuous fat phase 12 and dispersed water phase 14. Continuous fat phase 12 comprises a base oil and a hardstock fat. Dispersed phase 14 comprises water that is distributed throughout the continuous fat phase 12 in the form of small water droplets. The water droplets typically have a size (i.e., diameter) ranging from about 1.5 µm to about 10 µm. In many embodiments, the dispersed phase also comprises a water activity modifier (e.g., salt such as NaCl). In many embodiments, the hydrated fat pieces of the invention 10 have a physical granulation that allows 6% by weight to pass through a #4 USS mesh sieve. In many embodiments, the hydrated fat pieces of the invention 10 have a thickness that ranges from about 0.020 to about 0.100 inches, or ranges from about 0.030 to about 0.070 inches, or ranges from about 0.035 to about 0.055 inches. The color of the hydrated fat pieces can range from white to grey with a corresponding opaque to translucent transparency scale. Pieces can be texturally described as hard and brittle, to rather soft and pliable, but will fracture and break upon sufficient deformation. The surface of the piece may also exhibit some smear under shearing forces that will produce remnant residue on the article applying the shearing force.

Figure 2:
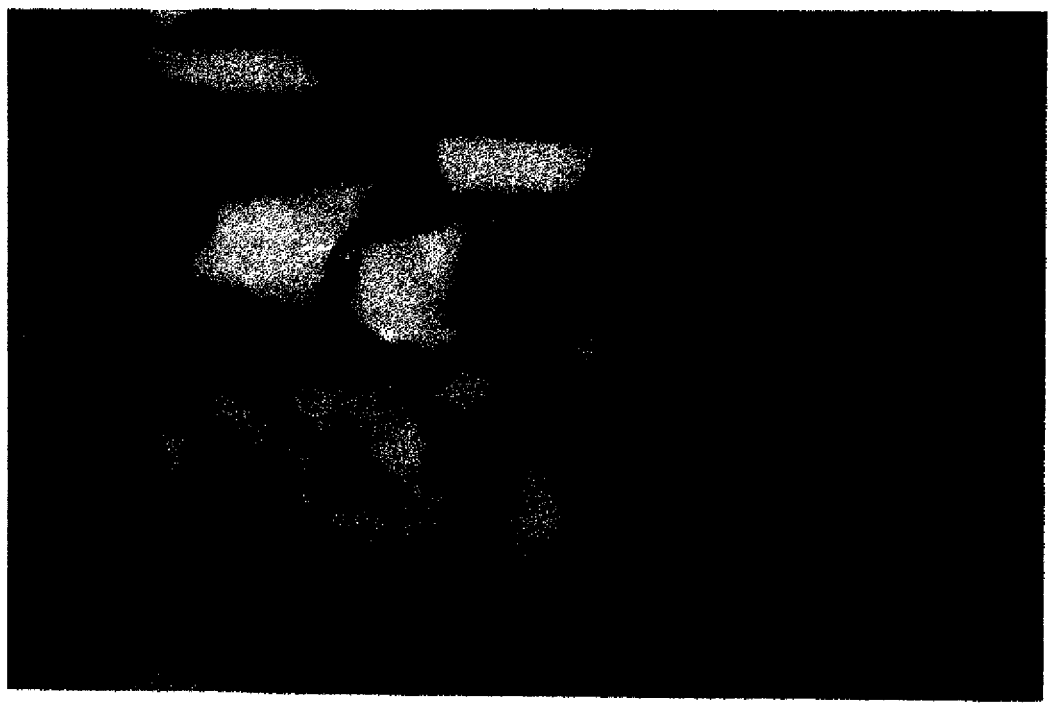
FIG. 2 is a digital image showing a representative embodiment of a hydrated fat piece composition of the invention.

Hydrated fat piece compositions of the invention comprise a plurality of discrete fat pieces that are individually separate and distinct from one another. The pieces may have any desired shape, for example, chips, flakes, rods, spheres, and other geometries. At room temperature, the individual fat pieces making up the hydrated fat piece composition do not adhere to one another to an appreciable degree. This allows the hydrated fat piece composition to be handled, dispensed, and applied to a dough composition as individual pieces, rather than as a solid. A photograph showing a representative hydrated fat piece composition is shown in FIG. 2.

In some embodiments, the hydrated fat pieces of the invention may be referred to as "low trans hydrated fat pieces." The low trans hydrated fat pieces contain a reduced amount of trans fatty acids as compared to previously known fat pieces. For example, the low trans hydrated fat pieces may contain about 50% wt. or less trans fatty acids, for example, about 25% wt. or less trans fatty acids. In many embodiments, the low trans hydrated fat pieces comprise: (i) a base oil, (ii) a hardstock fat, (iii) an emulsifier, (iv) salt, (v) water, and (vi) may optionally further comprise a hydrocolloid.

In some embodiments, the hydrated fat pieces may be referred to as "trans free hydrated fat pieces". In many embodiments, the trans free hydrated fat pieces contain about 4% wt. or less trans fatty acids. In many embodiments, the trans-free hydrated fat pieces of the invention comprise: (i) a base oil, (ii) a hardstock fat, (iii) an emulsifier, (iv) a hydrocolloid, (v) water, and (vi) may optionally further comprise a water activity modifier (e.g., salt).

The various ingredients that may be present in embodiments of the hydrated fat piece compositions of the invention are described in more detail below.

Base Oil

Hydrated fat pieces of the invention typically comprise one or more base oils. Useful base oils typically comprise fatty acid esters of glycerol, for example, monoglycerides, diglycerides, and triglycerides. Examples of base oils include natural or genetically modified soybean oil, corn oil, canola oil, copra oil, cottonseed oil, peanut oil, safflower oil, olive oil, sunflower oil, peanut oil, palm oil, palm kernel oil, coconut oil, rice bran oil, rapeseed oil, other vegetable nut/seed oils, partially hydrogenated vegetable oils, and mixtures thereof. Also useful are butter, lard, tallow, fish oils, fatty acids, and triglycerides that are derived from microorganisms, animals, and plants. Interesterified oils prepared from any of the foregoing base oils may also be useful. Mixtures of any of the foregoing base oils may also be useful.

In an exemplary low trans fat embodiment, the base oil comprises partially hydrogenated soybean oil, for example, having an iodine value (IV) ranging from about 50 to about 90. Trans fat refers to a monoglyceride, diglyceride, or triglyceride molecule that contains at least one esterified fatty acid molecule that has a trans configuration (i.e., a trans fatty acid). Trans fatty acids may be formed, for example, during hydrogenation of unsaturated fatty acids. A partially-hydrogenated soybean oil typically contains about 15% wt. to about 50% wt. trans fatty acids.

In an exemplary trans free embodiment, the base oil comprises refined, bleached, and deodorized (RBD) palm oil. Palm oil typically comprises about 50% saturated fatty acids and about 50% unsaturated fatty acids. The content of trans fatty acids can range from about 0 to about 4%.

In hydrated fat pieces of the invention, the base oil is typically present in an amount ranging from about 40% wt. to about 80% wt., or in an amount ranging from about 50% wt. to about 70% wt.

One useful base oil is available under the trade designation "106-150" from ADM. This base oil is a 100% soy interesterified shortening having 0 grams trans fat per serving and 4% trans fat maximum.

Hardstock Fat

In many embodiments, the hydrated fat pieces of the invention comprise a hardstock fat. By hardstock fat it is meant that the fat is a solid at room temperature or very near room temperature. Hardstock fats typically have a melting point ranging from about 50° C. to about 80° C., or from about 60° C. to about 70° C.

In many embodiments the hardstock fat comprises glycerides of fatty acids such as monoglycerides, diglycerides, and triglycerides. The glycerides have a fatty acid composition that comprises a very high percentage of saturated fatty acids. The solid fat component can be very low in trans fatty acids, since only a very few of the fatty acids have residual sites of unsaturation.

Representative examples of hardstock fats include, for example, natural or genetically modified soybean oil, corn oil, canola oil, copra oil, cottonseed oil, peanut oil, safflower oil, olive oil, sunflower oil, peanut oil, palm oil, palm kernel oil, coconut oil, rice bran oil, rapeseed oil and other vegetable nut/seed oils, butter, partially hydrogenated vegetable oils and mixtures thereof, lard, tallow, fish oils, fatty acids and triglycerides derived from microorganisms, animals, and plants. These fats and oils may be non-hydrogenated, partially-hydrogenated, or fully-hydrogenated.

In some embodiments, the hardstock fat is produced by hydrogenating the unsaturated fatty acids that are present in a vegetable oil in order to increase the amount of saturated fatty acids that are present in the vegetable oil. Techniques for hydrogenation of vegetable oils are known in the art and include, for example, reacting a vegetable oil having unsaturated fatty acids with hydrogen gas in the presence of a hydrogenation catalyst, for example, a supported nickel catalyst. The hydrogenated vegetable oil may be fully-hydrogenated in order to achieve an iodine value (IV) of about 10 or less, or about 5 or less. Representative hydrogenated solid fats include hydrogenated cottonseed oil, hydrogenated soybean oil, hydrogenated palm oil, palm oil, fully-hydrogenated palm kernel oil, fully-hydrogenated coconut oil, and mixtures thereof.

The hardstock fat or solid fat is typically present in the hydrated fat of the invention in an amount ranging from about 5% wt. to about 40% wt. In exemplary embodiments, the hardstock fat is present in an amount ranging from about 20% wt. to about 30% wt. For example, the solid fat may be fully-hydrogenated cottonseed oil, which is present at 25% wt. of the hydrated fat composition.

Suitable fully-hydrogenated soybean oil flakes can be obtained commercially under the trade designation "DRI-TEX S FLAKES" (from ACH Food Companies, Inc. of Cordova, Tenn.). This fully-hydrogenated soy oil has a melting point of about 165° F., and has an iodine value (IV) of between about 2 and about 5.

Water

Hydrated fat pieces of the invention comprise water that acts to hydrate the fat piece. The water is dispersed throughout the solid portion of the hydrated fat piece in the form of small water droplets. The hydrated fat pieces typically comprise about 5% wt. to about 50% wt. water, or from about 20% wt. to about 40% wt. water. In an exemplary embodiment, the hydrated fat pieces comprise about 30% wt. water.

The presence of water in the hydrated fat pieces of the invention can provide one or more beneficial properties to the hydrated fat pieces and/or dough compositions made using the hydrated fat pieces. For example, the presence of water reduces the total amount of fat that is present in the hydrated fat piece as compared to non-hydrated fat pieces. This allows the production of dough compositions that have a reduced total amount of fat as compared to dough compositions prepared with conventional non-hydrated fat pieces. The presence of water is also advantageous since the water provides a leavening effect to the dough compositions during baking. Specifically, the water that is present in the hydrated fat pieces of the invention can vaporize under typical baking conditions to yield steam that provides a leavening effect to the dough composition. In addition, the presence of water may harden the hydrated fat pieces, which provides an advantage when used in dough compositions.

Hydrocolloids

In some embodiments, the hydrated fat pieces of the invention comprise a hydrocolloid that serves as an emulsion stabilizer. Representative examples of hydrocolloids include agar, alginate, alginate+calcium, arabinoxylan, carrageenan, carrageenan+calcium, carboxymethylcellulose, cellulose, cellulose gum, cyclodextrins (in the presence of fat or other hydrophobic ligand), curdlan, gelatin, gellan, β-Glucan, guar gum, gum arabic, and hydroxypropylmethylcellulose (HPMC), konjac locust bean gum, methyl cellulose, pectin, pectin+calcium, soybean soluble polysaccharide (SSP), starch, xantham gum, and mixtures thereof. Preferred examples of hydrocolloids include agar, carrageenan, cellulose gum, locust bean gum, xanthan gum, and mixtures thereof.

When included, the hydrocolloid is typically present in an amount ranging from about 0.01% wt. to about 0.30% wt., or in an amount ranging from about 0.05% wt. to about 0.15% wt.

Water Activity Modifier

In some embodiments, the hydrated fat pieces of the invention comprise a water activity modifier. The inclusion of a water activity modifier such as salt (e.g., NaCl) reduces the water activity (Aw) of the hydrated piece. For example, in some embodiments, the water activity may be reduced from about Aw=0.98 to about Aw=0.75. Water activity may be measured, for example, using a Series 3TE AquaLab Water Activity Meter (manufactured by Decagon Devices, Inc., Pullman Wash. 99163). The reduction of water activity is useful, for example, in order to reduce or eliminate condensate from collecting on the inside of plastic storage bags during storage and shipping of the hydrated fat pieces of the invention. Condensate may potentially present a microbial hazard. In some embodiments, the presence of salt (e.g., NaCl) also contributes to the formation of a harder hydrated fat piece that has better production through-put than a formulation lacking this ingredient.

Alternative water activity modifiers include, for example, $MgCl_2$, glycerol, pyrophosphate, sodium phosphate, etc. may be substituted for our used in addition to the NaCl.

Emulsifiers

In some embodiments, the hydrated fat pieces of the invention comprise one or more emulsifiers. Examples of emulsifiers include non-hydrogenated, partially- and fully-hydrogenated derivatives as well as fractions of the following classes of emulsifiers lecithins, mono and diglycerides, acid esters of mono and diglycerides (AMGS or alpha-monoglycerol stearate is a distilled monoglyceride of this class), di-acetyltartaric esters of monoglycerides (DATEM), polyglycerol esters, sucrose esters, sorbitan esters, polysorbates, propylene glycol fatty acid esters, stearoyl-2-lactylates, oleoyl lactylates, ammonium phosphatides, silicates, and mixtures thereof. One useful emulsifier blend comprises polyglycerol polyricinoleate (PGPR is a polyglycerol ester of castor oil fatty acids) and distilled monoglycerol of about 10% monopalmitin and about 90% monostearin. PGPR may be obtained, for example, under the trade designation "DREWPOL PGPR" (from Stepan Co.) or "GRINDSTED PGPR 90" (from Danisco Co.). Distilled monoglycerol may be obtained, for example, under the trade designation "ALPHADIM DBK (from Caravan Ingredients) or "DIMODAN HS K-A" (from Danisco Co.). The emulsifier or emulsifier blend is typically present in the hydrated fat piece in an amount ranging from about 0.10% wt. to about 5.0% wt.

TABLE A summarizes typical ranges for the ingredients in low trans hydrated fat pieces of the invention.

TABLE A

| Ingredient | Useful Range (% wt.) | Exemplary Range (% wt.) |
|---|---|---|
| Base Oil (e.g., Partially Hydrogenated Soybean Oil) | 50 to 80 | 55 to 65 |
| Hardstock Fat (e.g., Fully Hydrogenated Soybean Oil) | 0 to 30 | 0 to 20 |

TABLE A-continued

| Ingredient | Useful Range (% wt.) | Exemplary Range (% wt.) |
|---|---|---|
| Water | 5 to 50 | 20 to 40 |
| NaCl | 0 to 8 | 0 to 5 |
| Emulsifier(s) | 0.10 to 5.0 | 0.3 to 3.0 |
| Sodium Benzoate | 0.01 to 0.30 | 0.05 to 0.15 |

TABLE B summarizes typical ranges for the ingredients in trans free hydrated fat pieces of the invention.

TABLE B

| Ingredient | Useful Range (% wt.) | Exemplary Range (% wt.) |
|---|---|---|
| Base Oil (e.g., Palm Oil) | 50 to 80 | 55-65 |
| Hardstock Fat (e.g., Fully Hydrogenated Soybean Oil) | 0 to 30 | 0-20 |
| Water | 5 to 50 | 20 to 40 |
| NaCl | 0 to 8 | 0 to 5 |
| Emulsifier(s) | 0.1 to 5.0 | 0.3 to 3.0 |
| Cellulose Gum | 0.01 to 0.30 | 0.05 to 0.15 |
| Sodium Benzoate | 0.01 to 0.30 | 0.05 to 0.15 |
| TBHQ 20 (Tenox 20 Eastman) | 0.01 to 0.30 | 0.05 to 0.15 |

Method of Manufacturing

Figure 3:
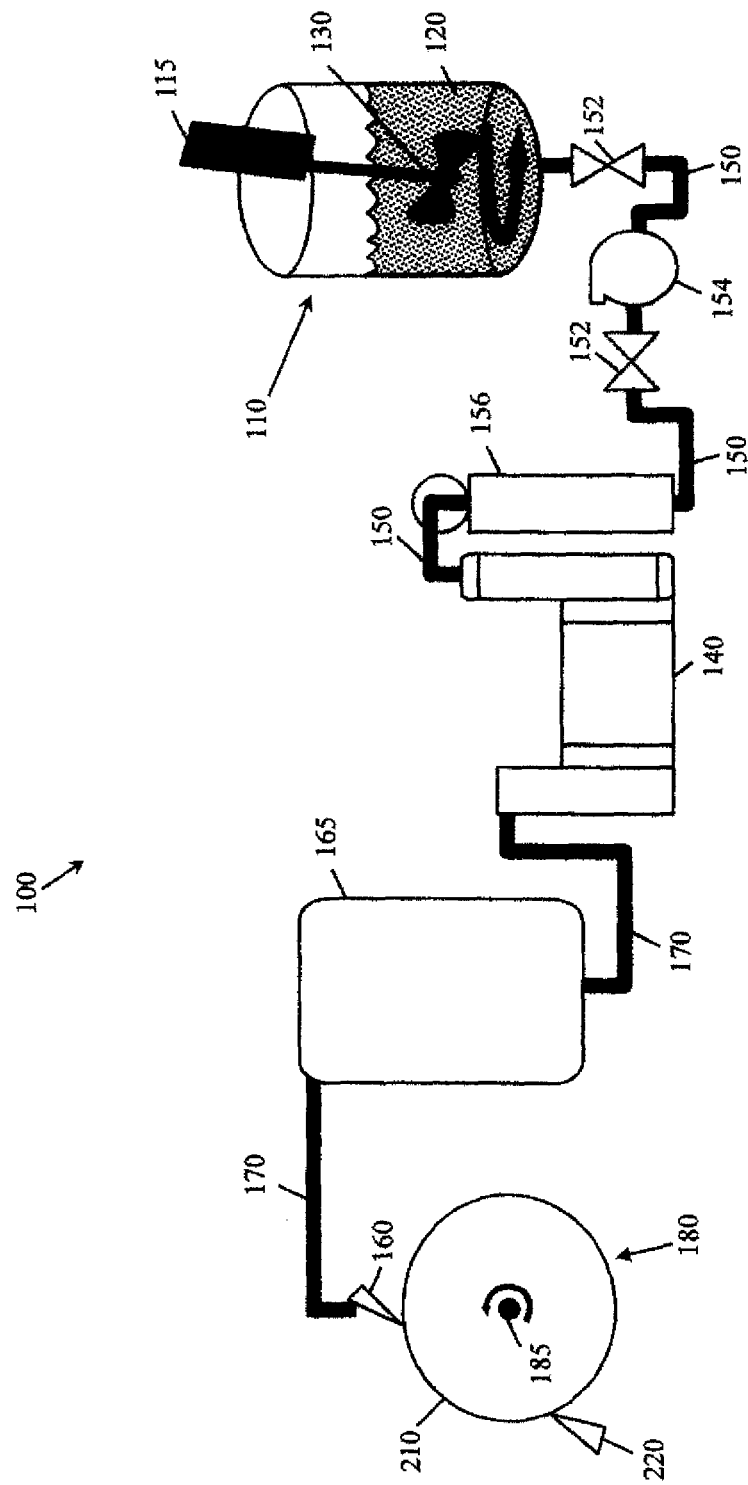
FIG. 3 is a representative flaking apparatus suitable for making hydrated fat piece compositions according to the invention.

Hydrated fat pieces of the invention may be prepared using a flaking apparatus as shown in FIG. 3. Referring to FIG. 3, flaking apparatus 100 includes hydrated fat reservoir 110 that holds the hydrated fat composition 120 that is to be flaked. Mounted in reservoir 110 is high shear mixer 115 that is equipped with a high shear-mixing blade 130. Examples of suitable high shear mixers include Breddo, IKA Rototron, Ross brand high shear mixers, and Lightnin brand variable speed high shear mixers. Hydrated fat reservoir 110 is connected to an optional in-line mixer 140 (e.g., IKA in-line, high shear mixer) though jacketed piping segment 150. Jacketed piping segment 150 also includes valves 152, pump 154, and flow meter 156. In-line mixer 140 is connected to a temperature controlled chute 160 by jacketed piping segment 170. Optionally, an in-line, 2-stage homogenizer 165 may be included between the in-line mixer 140 and temperature controlled chute 160. Temperature controlled chute 160 is mounted in close proximity to flaking roll 180 for application of the hydrated fat composition to the surface of the flaking roll 180. Flaking roll 180 is rotatably mounted so that during operation of apparatus 100, the flaking roll 180 rotates about its axis 185. The apparatus 100 further includes a scraping blade 220 that is positioned in contact with the outer surface 210 of the flaking roll 180 in order to scrape the solidified hydrated fat composition from the surface of the flaking roll.

Figure 3A:
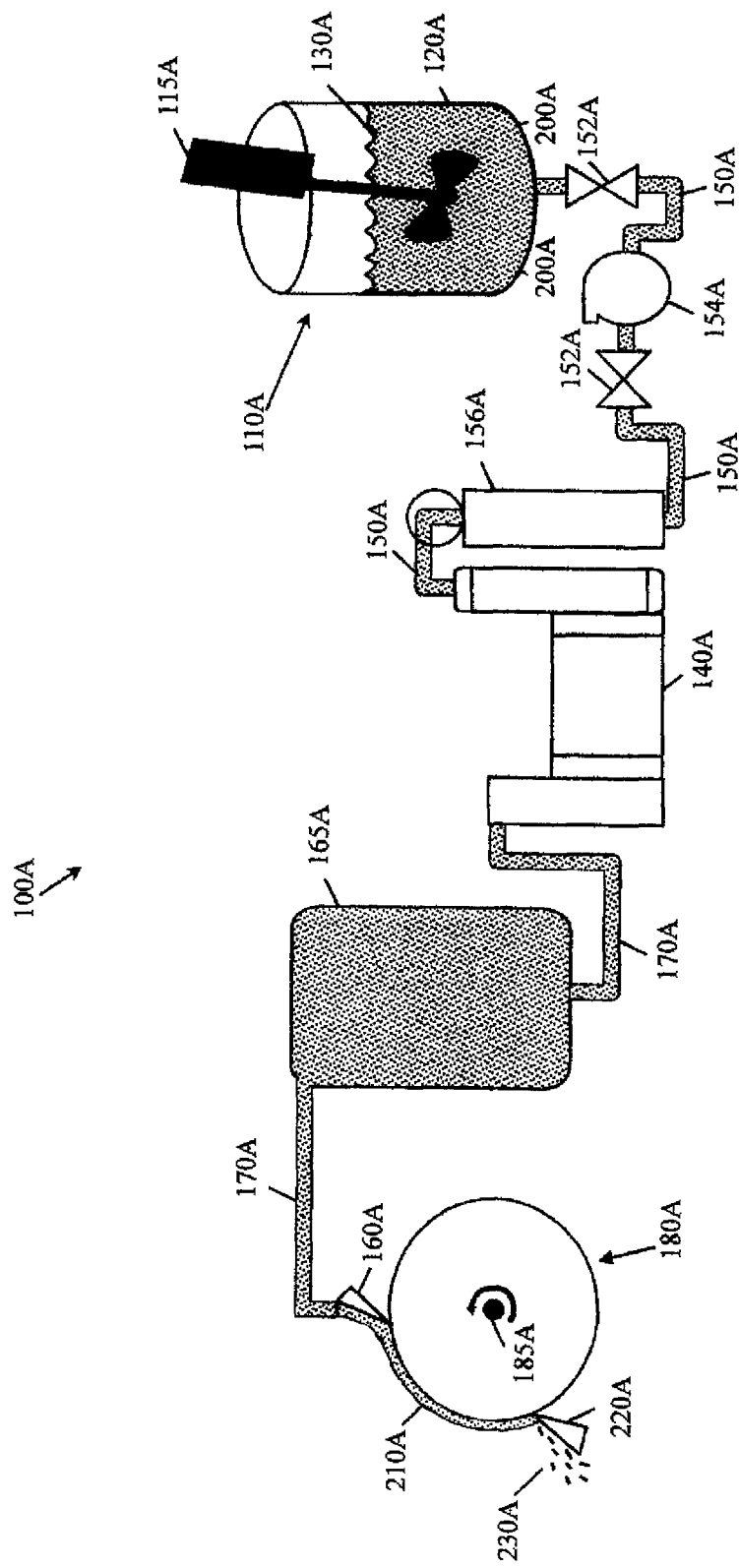
FIG. 3A is the flaking apparatus of FIG. 3 shown being used to make a hydrated fat piece composition.

FIG. 3A shows a schematic representation of apparatus 100A being used to produce hydrated fat pieces of the invention. In operation of apparatus 100A, a hydrated fat composition 120A is first prepared in reservoir 110A. The high shear mixer 115A is used to mix the various ingredients making up the hydrated fat composition 120A and to disperse the water throughout the composition in the form of small water droplets 200A. After preparing the hydrated fat composition 120A, the composition is then pumped through jacketed piping 150A, in-line mixer 140A, and jacketed piping 170A and optional in-line, 2-stage homogenizer 165A to temperature controlled chute 160A. Optional in-line mixer 140A functions to maintain the water that is present in the hydrated fat composition 120A in the form of small water droplets 200A dispersed throughout the hydrated fat composition. The optional, in-line homogenizer 165A functions to further stabilize the emulsion by further reducing the diameter of the water droplets and evenly dispersing them within the hydrated fat composition. The hydrated fat composition can be kept at a temperature ranging from about 40° C. to about 70° C. At temperature controlled chute 160A, the hydrated fat composition 190A is applied to the outer surface 210A of flaking roll 180A in the form of a thin coating. The coating can be about 0.5 mm to about 2.0 mm. During application of the hydrated fat composition 190A, the flaking roll 180A is rotated about its axis 185A. Cooling is supplied to the flaking roll 180A to cool the hydrated fat composition as it is placed in contact with the outer surface 210A of the flaking roll 180A. As the flaking roll rotates about its axis, the hydrated fat composition cools to a temperature below its melting point and solidifies on the outer surface 210A of the flaking roll 180A. After it is solidified, the hydrated fat composition 190A is scraped from the outer surface 210A of flaking roll 180A by scraping blade 220A that is positioned in contact with the outer surface of the flaking roll 180A. The scraping blade causes the hydrated fat composition to be dislodged from the outer surface of the flaking roll in the form of thin sheets of hydrated fat 230A. The hydrated fat pieces are then collected as a hydrated fat piece composition comprising a plurality of discrete hydrated fat pieces.

Optionally, additional stability of the hydrated fat piece may be provided by subjecting liquid fat to homogenization prior to or following the in-line mixer 140A. Homogenization creates small water droplets that are dispersed throughout the hydrated fat composition. The homogenization pressure can be about 1,000 psi, or ranging from about 2,500 to 25,000 psi in order to create the smallest water droplet diameter, leading to higher levels of stability.

Figure 4:
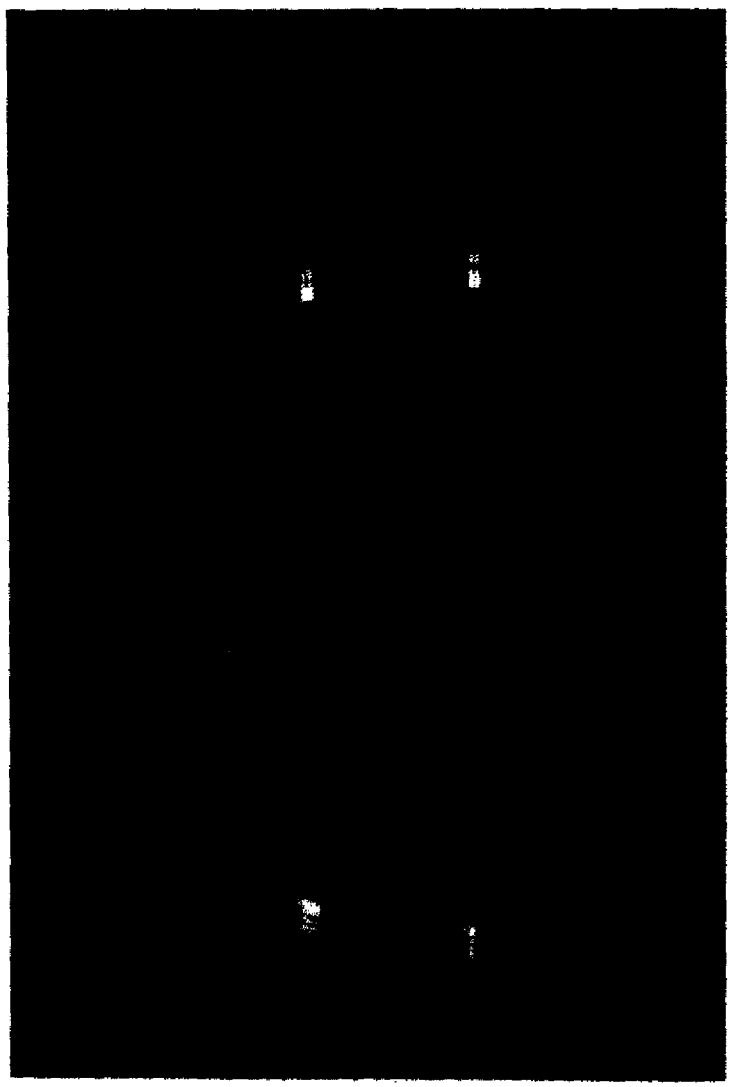
FIG. 4 is a digital image of an embodiment of a trough delivery system.

In some embodiments, a trough delivery system is used rather than a chute delivery system. In a trough delivery system the deposited hydrated fat composition is accumulated between the walls of the rotating drum frame and the rotating drum as shown in FIG. 4.

The desired fat piece dimensions may be controlled, for example, by factors such as the depth of the fat composition in the trough, the fat composition temperature at the point of deposit, the surface temperature of the rotating drum, and the rotation speed of the drum. For example, in many embodiments, the fat composition is deposited at temperature ranging from about 36° C. to 70° C., more typically ranging from about 48° C. to 57° C. In many embodiments, the trough depth of the fat composition ranges from about 0.5 to about 6.0 inches, more typically ranging from about 2.0 to about 4.0 inches. In many embodiments the surface temperature of the drum ranges from about −25° C. to −10° C., more typically ranging from about −20° C. to −25° C.

Liquid Dough/Batter Compositions and Articles

The hydrated fats pieces of the invention may be used to prepare various dough compositions and dough articles. The dough compositions typically comprise flour, water, one or more leavening agents, and may also include other optional ingredients.

The dough compositions may optionally include one or more types of flour. The dough compositions can comprise about 15% wt. or greater flour based on the total weight of the dough composition. Wheat flour may be obtained commercially from such sources as ADM Milling; Bay State Milling Co.; Conagra Inc.; General Mills, Inc.; Horizon Milling, LLC; and Rohstein Corp.

Dough compositions of the invention typically include liquid components, for example, water, milk, eggs, and oil, or any combination of these. Water is present in dough compositions of the invention to provide the dough composition with the desired rheology. Water may be added during processing in the form of ice, to control the dough temperature during processing; the amount of any such water used is included in the amount of liquid components. The precise amount of water depends on factors known to those skilled in the dough making art including, for example, whether the dough composition is a developed or under-developed composition.

Water can be present in dough compositions of the invention in an amount of about 15% wt. or greater. In developed compositions, the amount of water from all sources, for example, water, eggs, milk, etc. should not be so high that the dough composition becomes soft and cannot maintain its desired closed-cell structure including bubbles of carbon dioxide and water vapor. Also, the amount of water should not be so low that the dough composition is dry and has no ability to expand.

The dough compositions can be caused to expand (i.e., leaven) by any leavening mechanism, such as by one or more of the effects of: entrapped gas, such as entrapped carbon dioxide, entrapped oxygen, or both; by action of chemical leavening agents; or by action of a biological agent, such as a yeast. Thus, a leavening agent may be an entrapped gas, such as layers or cells (bubbles) that contain carbon dioxide, water vapor, or oxygen, etc.; any type of yeast (e.g., cake yeast, cream yeast, dry yeast, etc.); or a chemical leavening system (e.g., containing a basic chemical leavening agent and an acidic chemical leavening agent that react to form a leavening gas, such as carbon dioxide).

Dough compositions of the invention can be yeast-leavened. As used herein the term "yeast-leavened" refers to dough compositions that are leavened primarily due to the production of gaseous metabolites of yeast; chemical leavening agents may optionally be present, but in minor amounts, preferably less than about 10% wt. chemical leavening agent based on the total weight of the leavening agent (yeast and chemical leavening agent) or may not be present at all. The yeast may be any suitable yeast known to those of skill in the art, for example, fresh cream/liquid yeast, fresh compressed yeast, active dry yeast, and instant yeast. In some embodiments, the yeast is fresh compressed yeast (e.g., in cake or crumbled form) comprising about 65% to about 75% water and about 25% to about 35% yeast. The amount of yeast can be an amount that will produce a desired volume of gaseous metabolites, as known to one of skill in the art. The amount of yeast present in the dough composition can be up to about 10% wt. (e.g., about 2% wt. to about 8% wt. for developed dough compositions, and less than about 1% wt. to about 5% wt. for under-developed compositions).

In some embodiments a chemical leavening agent may be used in addition to yeast. Acidic chemical leavening agents (or acid agents) that may be useful include those generally known in the dough and bread-making arts. Acidic agents may be relatively soluble within different temperature ranges and may or may not be encapsulated. Examples of acidic agents include sodium aluminum phosphate (SALP), sodium acid pyrophosphate (SAPP), monosodium phosphate, monocalcium phosphate monohydrate (MCP), anhydrous monocalcium phosphate (AMCP), dicalcium phosphate dehydrate (DCPD), glucono-delta-lactone (GDL), an others. Commercially available acidic chemical leavening agents include those sold under the trade designations "LEVN-LITE" (SALP); "PAN-O-LITE" (SALP+MCP); "STABIL-9" (SALP+AMPC); "PY-RAN" (AMCP); and "HT MCP" (MCP).

The dough composition may also include an encapsulated basic chemical leavening agents. Useful basic chemical leavening agents are known in the dough and bread-making arts, and include soda (i.e., sodium bicarbonate, $NaHCO_3$), potassium bicarbonate ($KHCO_3$), ammonium bicarbonate ($NH_4HCO_3$), etc. Encapsulating the basic chemical leavening agent provides separation between the basic agent and the bulk of the dough composition. If present, chemical leavening agents can comprise less than about 1% wt of the dough composition (e.g., less than about 0.5% wt. or less than about 0.3% wt.).

Dough compositions of the invention may optionally include one or more fat components that are added to the dough composition at the time the dough is prepared and are substantially interspersed and distributed throughout the dough composition. The amount of fat in the dough product due to the mixed-in fat component will depend upon the type of dough composition being prepared, but will generally be about 10% wt or less (e.g., about 1% to about 5% wt; or about 2% to about 3% wt). The type of fat in a dough composition of the invention is not particularly limited, and may be derived from vegetable, dairy and marine sources including butter oil or butterfat, soybean oil, corn oil, rapeseed or canola oil, copra oil, cottonseed oil, fish oil, safflower oil, olive oil, sunflower oil, peanut oil, palm oil, palm kernel oil, coconut oil, rice bran oil and other plant derived oils, such as vegetable or nut oils. Examples of shortenings include animal fats, such as lards, butter and hydrogenated vegetable oils, such as margarine. Mixtures of different fats may also be used.

The dough composition may optionally include one or more sweeteners, natural or artificial, liquid or dry. If a liquid sweetener is used, the amount of other liquid components may be adjusted accordingly. Examples of suitable dry sweeteners include lactose, sucrose, fructose, dextrose, maltose, corresponding sugar alcohols, and mixtures thereof. Examples of suitable liquid sweeteners include high fructose corn syrup, malt, and hydrolyzed corn syrup. Often, dough compositions include up to about 8% wt sweetener.

The dough composition may optionally include additional flavorings, for example, salt, such as sodium chloride and/or potassium chloride; whey; malt; yeast extract; inactivated yeast; spices; vanilla; natural and artificial flavors; etc.; as is known in the dough product arts. The additional flavoring can be included in an amount in the range from about 0.1% wt to about 10% wt of the dough composition (e.g., from about 0.2% wt to about 5% wt of the dough composition.

The dough composition may optionally include particulates, such as raisins, currants, fruit pieces, nuts, seeds, vegetable pieces, and the like, in suitable amounts.

The dough composition may optionally include other additives, colorings, and processing aids, for example, gliadin (e.g., less than about 1% to improve extensibility in under-developed dough), emulsifiers include lecithin, diglycerides, polyglycerol esters, and the like, (e.g., diacetylated tartaric esters of monoglyceride (DATEM) and sodium stearoyl lactylate (SSL)).

In many embodiments, the hydrated fat pieces are used to prepare laminated dough compositions for use in such products as biscuits. Generally, a laminated dough can be prepared by the steps of: (a) providing a layer of a dough composition comprising flour and water; (b) applying a plurality of hydrated fat pieces of the invention to a surface of the dough layer; (c) repeatedly folding and compressing (i.e., sheeting) the dough layer to form a laminated dough comprising a plurality of layers of dough separated by layers of hydrated fat.

Hydrated fat pieces of the invention may also be used in non-laminated dough compositions, for example, non-laminated biscuits. In certain embodiments, particularly dough compositions that include a water activity modifier to modify the salt content of a hydrated fat piece, the dough composition can be reformulated to compensate for, and to be compatible with the water activity-modified fat piece. This can be advantageous for anti-microbial purposes. Alternatively, since a hydrated fat piece can be formulated to have various levels of water content, preservative content (i.e. sodium benzoate, potassium sorbate, etc.), emulsifier content, saturated fat content or transfat content, a dough composition would accordingly be adjusted to be compatible with such modified hydrated fat piece. Adjusting the dough composition to be compatible with the modified hydrated fat piece can impart improved organoleptic, nutritional, functional and/or commercial characteristics.

The invention will now be described with reference to the following non-limiting examples.

EXAMPLES

Example 1

Trans-Free Flake Pieces

Trans-free hydrated pieces of the invention were prepared using an apparatus of the type shown in FIG. 3. The description of the process was as follows.

1. Fully-hydrogenated soybean oil (Dritex S) and distilled monoglyceride (emulsifier AMOS) were melted together in a non-agitated, electrically-heated process kettle until a temperature of 65° C. was reached (or until the resulting liquid blend was clear).

2. The hot liquid oil and emulsifier blend was then transferred to a jacketed/heated use kettle (i.e., a water-jacketed kettle with shear agitator) and was combined with melted palm oil at 65° C. The resulting blend was kept heated in the use kettle at a temperature of 65° C.±2.0° C. under moderate agitation (250 to 300 rpm).

3. In a separate tank, water was heated to a temperature of 65° C.±2.0° C.

4. Cellulose gum (CMC), tertiary-butylhydroquinone (TBHQ), and sodium benzoate (anti-microbial) were added to the hot water using moderate agitation sufficient for completely hydrating and dissolving these dry ingredients. The temperature of the mixture was maintained at 65° C.±2.0° C.

5. The water mixture was added to the oil/emulsifier mixture in the use kettle. Agitation was increased to 600 to 800 rpm to create high shear and to form a water-in-oil emulsion. Agitation was maintained on the blend during the flake processing in order to deliver the emulsion intact into the processing line.

6. As the use kettle valve was opened, the emulsion flowed to the positive displacement pump where the emulsion was then pumped at a rate of 428 ml/min (+50 ml/min) through heat-traced piping (water bath set point 72° C.) to a high-shear in-line IKA mixer.

7. The temperature of the emulsion at the high-shear mixer was 65° C.±2.0° C., and the mixer shear rate was controlled by a VFD, which was adjusted as desired to achieve a stable emulsion at the deposition point on the flaking drum. A temperature increase of between about 15° C. to 25° C. may be observed passing through the high-shear mixer depending upon the level of shear in the mixer, and the constituents of the emulsion entering the mixer.

8. Further emulsion stability may be added by the use of a 2-stage, high-pressure homogenizer with pressure ranging between 1000 psi to 25,000 psi. The stability of the emulsion is a function of the formulation, shear dependence, and emulsifiers present in the hydrated fat composition. Homogenization can produced water droplets in the range of 5 μm to 10 μm, evenly dispersed throughout the liquid fat, leading to better stability of the emulsion.

9. The emulsion traveled from the high-shear process to the flaking roll where the emulsion having a temperature of 55° C.±20° C. was deposited onto the cold surface of the rotating drum. The surface temperature of the drum was −17° C.±2° C. As the drum rotated at a speed of about 0.53 rpm the emulsion cooled and crystallized on the drum surface. The solid sheet fractured or was scraped from the surface of the drum and the trans-free shortening flakes were thus produced.

Example 2

Trans-Containing Flake Pieces

Trans-containing hydrated pieces of the invention were prepared using an apparatus of the type shown in FIG. 3. The description of the process was as follows.

1. The partially hydrogenated soybean oil was melted and was held at 65° C.±2.0° C.

2. The fully hydrogenated soybean oil (Dritex S), and distilled monoglyceride (emulsifier AMGS) were melted together in a non-agitated, electrically-heated process use kettle to a temperature of 65° C., or until the resulting liquid blend was clear.

3. The hot liquid oil and emulsifier blend and the melted partially hydrogenated soybean oil were then transferred to a heated use kettle (water-jacketed BREDDO with high shear agitator) and this resulting blend was kept heated in the use kettle at a temperature of 65° C.±2.0° C. under moderate agitation (250 to 300 rpm).

4. In a separate tank, water was heated to a temperature of 65° C.±2.0° C.

5. Sodium benzoate (anti-microbial) was added to the hot water using moderate agitation that was sufficient for completely hydrating and dissolving the sodium benzoate. The temperature of the mixture was maintained at 65° C.±2.0° C.

6. The water/sodium benzoate mixture was added to the oil/emulsifier mixture in the kettle, and agitation was increased to 600 to 800 rpm to create high shear in order to form a water-in-oil emulsion. Agitation was maintained on the blend during flake processing in order to deliver the emulsion intact into the processing line.

7. As the use kettle valve was opened, the emulsion proceeds to the positive displacement pump where the emulsion was then pumped at a rate of 428 ml/min (±50 ml/min) through heat traced piping (water bath setpoint was 72° C.) to the high-shear in-line IKA mixer.

8. The temperature of the emulsion at the high-shear mixer was 65° C.±2.0° C., and the mixer shear rate was controlled by a VFD which was adjusted to achieve a stable emulsion at the deposition onto the flaking drum. A temperature increase of between 15 to 25° C. may be observed passing through the high-shear mixer depending upon the level of shear obtained in the mixer, and the constituents of the emulsion entering the mixer.

9. Further emulsion stability may be added by use of a 2-stage, high-pressure homogenizer with pressure ranges between 1000 psi to 15,000 psi. Homogenization can produced water droplets in the range of 5 μm to 10 μm, evenly dispersed throughout the liquid fat, leading to better stability of the emulsion.

10. The emulsion proceeds from the high-shear process to the flaking roll where the hot oil 55° C.±20° C. is deposited onto the cold surface of the rotating drum (−17° C.±2° C. at about 0.53 rpm). As the drum rotates and the emulsion cools and crystallizes on the drum surface the solid sheet fractures or was scraped from the surface of the drum and the trans-containing shortening flakes are thus produced.

Example 3

The hydrated fat pieces prepared as described in Examples 1 and 2 were used to prepare biscuit dough compositions. A representative biscuit composition is provided in TABLE D.

TABLE D

| Ingredient | Formulation Amount (% wt.) |
| --- | --- |
| Flour | 15 to 45 |
| Water | 5 to 45 |
| Salt | 0 to 5 |
| Sugar | 1 to 8 |
| Leavening | 0.2 to 4 |
| Hydrated Fat Pieces | 1 to 20 |

The process used to mix a biscuit dough includes incorporating all ingredients except the hydrated fat flakes and leavener, and mixing to partial development suitable for entrapping leavening gases, but not so developed as to produce a bread-like or tough texture in the finished baked product. After the initial partial mixing was complete, the hydrated fat flakes and leavener were added to the partially mixed dough, and mixing was continued until the shortening was evenly distributed throughout the dough matrix. At this stage, the dough was ready for final processing which included sheeting, cutting, freezing, and packaging. The incorporation of the shortening particulates serve to provide the desired cellular structure during baking and taste and texture during eating that accompany a typical "biscuit" in the American eating experience.

Other embodiments of this invention will be apparent to those skilled in the art upon consideration of this specification or from practice of the invention disclosed herein. Various omissions, modifications, and changes to the principles and embodiments described herein may be made by one skilled in the art without departing from the true scope and spirit of the invention which is indicated by the following claims.

What is claimed is:

1. A hydrated fat piece composition comprising: a plurality of hydrated fat pieces wherein the hydrated fat pieces individually comprise: (a) a solid fat phase; (b) a plurality of water droplets distributed throughout the solid fat phase; and (c) from about 0.1 to about 5.0 weight percent emulsifier; wherein the hydrated fat pieces comprise discrete, separate pieces that at room temperature do not adhere to one another to an appreciable degree.

2. The hydrated fat piece composition of claim 1, wherein the hydrated fat pieces comprise shapes selected from the group consisting of chips, flakes, rods, spheres, other geometries, and mixtures thereof.

3. The hydrated fat piece composition of claim 1, wherein the solid fat phase comprises a base oil and a hardstock fat.

4. The hydrated fat piece composition of claim 1, wherein the hydrated fat pieces are low in trans fatty acids.

5. The hydrated fat piece composition of claim 4, wherein the hydrated fat pieces comprise about 50% wt. or less trans fatty acids.

6. The hydrated fat piece composition of claim 1, wherein the hydrated fat pieces are free of trans fatty acids.

7. The hydrated fat piece composition of claim 6, wherein the hydrated fat pieces comprise about 4% wt. or less trans fatty acids.

8. The hydrated fat piece composition of claim 1, wherein the hydrated fat pieces further comprise a hydrocolloid.

9. The hydrated fat piece composition of claim 1, wherein the hydrated fat pieces comprise a water activity modifier.

10. The hydrated fat piece composition of claim 9, wherein the water activity modifier comprises NaCl, $MgCl_2$, glycerol, pyrophosphate, sodium phosphate, or a mixture thereof.

11. The hydrated fat piece composition of claim 3, wherein the base oil is selected from the group consisting of natural or genetically modified soybean oil, corn oil, canola oil, copra oil, cottonseed oil, peanut oil, safflower oil, olive oil, sunflower oil, peanut oil, palm oil, palm kernel oil, coconut oil, rice bran oil, rapeseed oil and other vegetable nut/seed oils, partially hydrogenated vegetable oils, butter, lard, tallow, fish oils, fatty acids and triglycerides derived from microorganisms, animals, and plants, interesterified oils, and mixtures thereof.

12. The hydrated fat piece composition of claim 3, wherein the base oil is present in an amount ranging from about 50% wt. to about 80% wt of the hydrated fat pieces.

13. The hydrated fat piece composition of claim 3, wherein the base oil comprises less than about 5% wt. trans fatty acids.

14. The hydrated fat piece composition of claim 3, wherein the base oil is not hydrogenated.

15. The hydrated fat piece composition of claim 3, wherein the base oil comprises canola oil.

16. The hydrated fat piece composition of claim 3, wherein the hardstock is selected from the group consisting of natural or genetically modified soybean oil, corn oil, canola oil, copra oil, cottonseed oil, peanut oil, safflower oil, olive oil, sunflower oil, peanut oil, palm oil, palm kernel oil, coconut oil, rice bran oil, rapeseed oil and other vegetable nut/seed oils, butter, partially hydrogenated vegetable oils and mixtures thereof, lard, tallow, fish oils, fatty acids and triglycerides derived from microorganisms, animals, and plants.

17. The hydrated fat piece composition of claim 3, wherein the hardstock is fully-hydrogenated.

18. The hydrated fat piece composition of claim 3, wherein the hardstock has an iodine value of less than about 10.

19. The hydrated fat piece composition of claim 3, wherein the hardstock is present in an amount up to about 30% wt of the hydrated fat pieces.

20. The hydrated fat piece composition of claim 8, wherein the hydrocolloid is selected from the group consisting of agar, alginate, alginate+calcium, arabinoxylan, carrageenan, carrageenan+calcium, carboxymethylcellulose, cellulose, cellulose gum, cyclodextrins, curdlan, gelatin, gellan, β-Glucan, guar gum, gum arabic, hydroxypropylmethylcellulose (HPMC), locust bean gum, methyl cellulose, pectin, pectin+calcium, soybean soluble polysaccharide (SSP), starch, xantham gum, and mixtures thereof.

21. The hydrated fat piece composition of claim 8, wherein the hydrocolloid is selected from the group consisting of sodium carboxymethyl cellulose, cyclodextrins, agar, carrageenan, cellulose gum, locust bean gum, xanthan gum, and mixtures thereof.

22. The hydrated fat piece composition of claim 1, wherein the emulsifier is selected from the group consisting of lecithins, mono and diglycerides, acid esters of mono and diglycerides (AMGS or alpha-monoglycerol stearate is a distilled monoglyceride of this class), di-acetyltartaric esters of monoglycerides (DATEM), polyglycerol esters, sucrose esters, sorbitan esters, polysorbates, propylene glycol fatty acid esters, stearoyl-2-lactylates, oleoyl lactylates, ammonium phosphatides, silicates, and mixtures thereof.

23. The hydrated fat piece composition of claim 1, wherein the water is present in an amount ranging from about 5 to about 50% wt.

24. The hydrated fat piece composition of claim 1 wherein the water droplets have a size ranging from about 1.5 μm to about 10 μm.

25. A dough composition comprising:
a dough; and
a plurality of hydrated fat pieces distributed throughout the dough; wherein the hydrated fat pieces comprise (a) a solid fat phase; (b) from about 0.1 to about 5.0 weight percent emulsifier; and (c) a plurality of water droplets distributed throughout the solid fat phase; wherein the hydrated fat pieces comprise discrete, separate pieces that at room temperature do not adhere to one another to an appreciable degree.

26. The dough composition of claim 25, wherein the dough composition is laminated.

27. The dough composition of claim 25, wherein the dough composition is non-laminated.

28. The hydrated fat piece composition of claim 1 wherein the hydrated fat pieces comprise emulsifier selected from the group consisting of: a monoglyceride, a diglyceride, a polyglycerol ester, a carboxy methyl cellulose, and combinations thereof.

29. The hydrated fat piece composition of claim 1 wherein the hydrated fat pieces comprise polyglycerol polyricinoleate.

30. The hydrated fat piece composition of claim 1 wherein the hydrated fat pieces comprise alpha-monoglycerol stearate.

31. The hydrated fat piece composition of claim 1 wherein the hydrated fat pieces comprise from 40 to 80 weight percent base oil, from 0 to 40 percent hardstock fat, from 5 to 50 percent water, and from 0.1 to 3.0 weight percent emulsifier.

32. The hydrated fat piece composition of claim 31 wherein the base oil is selected from partially hydrogenated soybean oil, palm oil, and combinations thereof, and the hardstock fat is fully hydrogenated soybean oil.

33. The hydrated fat piece composition of claim 32 wherein the emulsifier is selected from the group consisting of polyglycerol polyricinoleate, alpha-monoglycerol stearate, and combinations thereof.

34. The hydrated fat piece composition of claim 1 wherein the hydrated fat pieces comprise from 55 to 65 weight percent base oil, from 0 to 20 weight percent hardstock fat, from 5 to 50 weight percent water, and from 0.1 to 3.0 weight percent emulsifier.

35. The hydrated fat piece composition of claim 34 wherein the base oil is selected from partially hydrogenated soybean oil, palm oil, and combinations thereof, and the hardstock fat is fully hydrogenated soybean oil.

36. The hydrate fat piece composition of claim 35 wherein the emulsifier is selected from the group consisting of polyglycrol polyricinoleate, alpha-monoglycerol stearate, and combinations thereof.

37. The hydrated fat piece composition of claim 1 wherein the fat piece has a thickness in a range of from 0.020 to about 0.100 inch.

38. The hydrated fat piece composition of claim 1 wherein the hydrated fat pieces comprise shapes selected from the group consisting of chips, flakes, rods, spheres, and mixtures thereof.

39. The dough composition of claim 25 wherein the hydrated fat pieces have a thickness in a range from 0.020 to about 0.100 inch.

40. The dough composition of claim 39 wherein the hydrated fat pieces comprise shapes selected from the group consisting of chips, flakes, rods, spheres, and mixtures thereof.

41. The hydrated fat piece composition of claim 1 wherein the hydrated fat pieces consist essentially of fat selected from base oil or a combination of base oil and hardstock fat, water, optional salt, emulsifier, and preservative.

42. The hydrated fat piece composition of claim 1 wherein the hydrated fat pieces consist essentially of:
fat selected from base oil or a combination of base oil and hardstock fat,
water,
optional salt,
emulsifier,
preservative, and
a water activity modifier, a hydrocolloid, or a combination of a water activity modifier and a hydrocolloid.

43. The hydrated fat piece composition of claim 1 wherein the hydrated fat pieces consist essentially of:
from 50 to 80 weight percent base oil,
not more than 20 weight percent hardstock fat,
from 5 to 50 weight percent water,
from 0 to 8 weight percent salt,
from 0.1 to 5.0 weight percent emulsifier, and
from 0.01 to 0.30 weight percent preservative.

44. The hydrated fat piece composition of claim 43 wherein the hardstock fat is fully hydrogenated soybean oil.

45. The hydrated fat piece composition of claim 1 comprising from 0.3 to 3 weight percent emulsifier.

* * * * *